US011935371B2

(12) United States Patent
Gates et al.

(10) Patent No.: US 11,935,371 B2
(45) Date of Patent: *Mar. 19, 2024

(54) TOKEN COLLECTION ASSEMBLY

(71) Applicant: WHIRLPOOL CORPORATION, Benton Harbor, MI (US)

(72) Inventors: Anthony M. Gates, St. Joseph, MI (US); John Aruna, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 240 days.

This patent is subject to a terminal disclaimer.

(21) Appl. No.: 17/495,869

(22) Filed: Oct. 7, 2021

(65) Prior Publication Data

US 2022/0028204 A1 Jan. 27, 2022

Related U.S. Application Data

(63) Continuation of application No. 16/573,114, filed on Sep. 17, 2019, now Pat. No. 11,170,598.

(51) Int. Cl.
*G07F 9/06* (2006.01)
*G07F 17/20* (2006.01)

(52) U.S. Cl.
CPC ................ *G07F 9/06* (2013.01); *G07F 17/20* (2013.01)

(58) Field of Classification Search
CPC .................................. G07F 9/06; G07F 17/20
See application file for complete search history.

(56) References Cited

U.S. PATENT DOCUMENTS

| | | | |
|---|---|---|---|
| 2,112,599 A | 7/1932 | Heitman | |
| 3,175,759 A | 3/1965 | Teale et al. | |
| 3,926,266 A | 12/1975 | Dorgnon | |
| 3,927,735 A | 12/1975 | Miericke et al. | |
| 4,036,346 A | 7/1977 | Livingston | |
| 4,697,687 A | 10/1987 | Wilson | |
| 5,224,579 A | 7/1993 | Brown | |
| 6,082,519 A | 7/2000 | Martin et al. | |
| 6,708,811 B2 | 3/2004 | Roscoe | |
| 7,410,095 B2 | 8/2008 | Selover | |
| 7,635,295 B2 | 12/2009 | Enomoto et al. | |
| 9,196,112 B2 | 11/2015 | Heo | |
| 11,170,598 B2 * | 11/2021 | Gates | G07F 9/06 |
| 2008/0171508 A1 | 7/2008 | Enomoto et al. | |
| 2018/0225908 A1 | 8/2018 | Mackay et al. | |
| 2021/0082225 A1 | 3/2021 | Gates et al. | |

FOREIGN PATENT DOCUMENTS

| | | |
|---|---|---|
| JP | H063504 Y2 * | 1/1994 |
| JP | 4337663 B2 * | 9/2009 |
| WO | 2017131491 A1 | 8/2017 |

* cited by examiner

*Primary Examiner* — Christle I Marshall
(74) *Attorney, Agent, or Firm* — Price Heneveld LLP

(57) ABSTRACT

A vault defines a cavity wherein openings define the vault and are open into the cavity. A token box is disposed within the cavity of the vault. A cover feature has a shell and a base. The base is slidably coupled to the vault to transition between a first position and a second position. The shell is hingedly coupled to the base to hinge between a covering position and a servicing position when the base is in the second position.

20 Claims, 10 Drawing Sheets

TOKEN COLLECTION ASSEMBLY

CROSS-REFERENCE TO RELATED APPLICATION

The present application is a Continuation of U.S. patent application Ser. No. 16/573,114, filed on Sep. 17, 2019, and entitled "TOKEN COLLECTION ASSEMBLY," now U.S. Pat. No. 11,170,598, the entire contents of which is incorporated herein by reference in its entirety.

BACKGROUND OF THE DISCLOSURE

The present disclosure generally relates to a commercial laundry appliance, and more specifically, to a token collection assembly for a commercial laundry appliance.

SUMMARY OF THE DISCLOSURE

According to one aspect of the present disclosure, an appliance includes a vault that defines a cavity and has openings that are defined by a first surface of the vault. A token box is positioned within the cavity and is partially open relative to the openings in the vault. A cover feature has a rotating shell that is operably coupled to a slidable base that defines locking apertures. The cover feature is operably coupled to the vault via fasteners.

According to another aspect of the present disclosure, a vault defines an interior cavity and openings are defined by a wall of the vault and provides selective access into the cavity. A base is slidably coupled to the vault between a first position and a second position. The base defines locking apertures that are offset relative to the openings of the vault in the second position of the base. A shell is operable relative to the base only in the second position.

According to yet another aspect of the present disclosure, a vault defines a cavity wherein openings define the vault and are open into the cavity. A token box is disposed within the cavity of the vault. A cover feature has a shell and a base. The base is slidably coupled to the vault to transition between a first position and a second position. The shell is hingedly coupled to the base to hinge between a covering position and a servicing position when the base is in the second position.

These and other features, advantages, and objects of the present disclosure will be further understood and appreciated by those skilled in the art by reference to the following specification, claims, and appended drawings.

Figure 1:
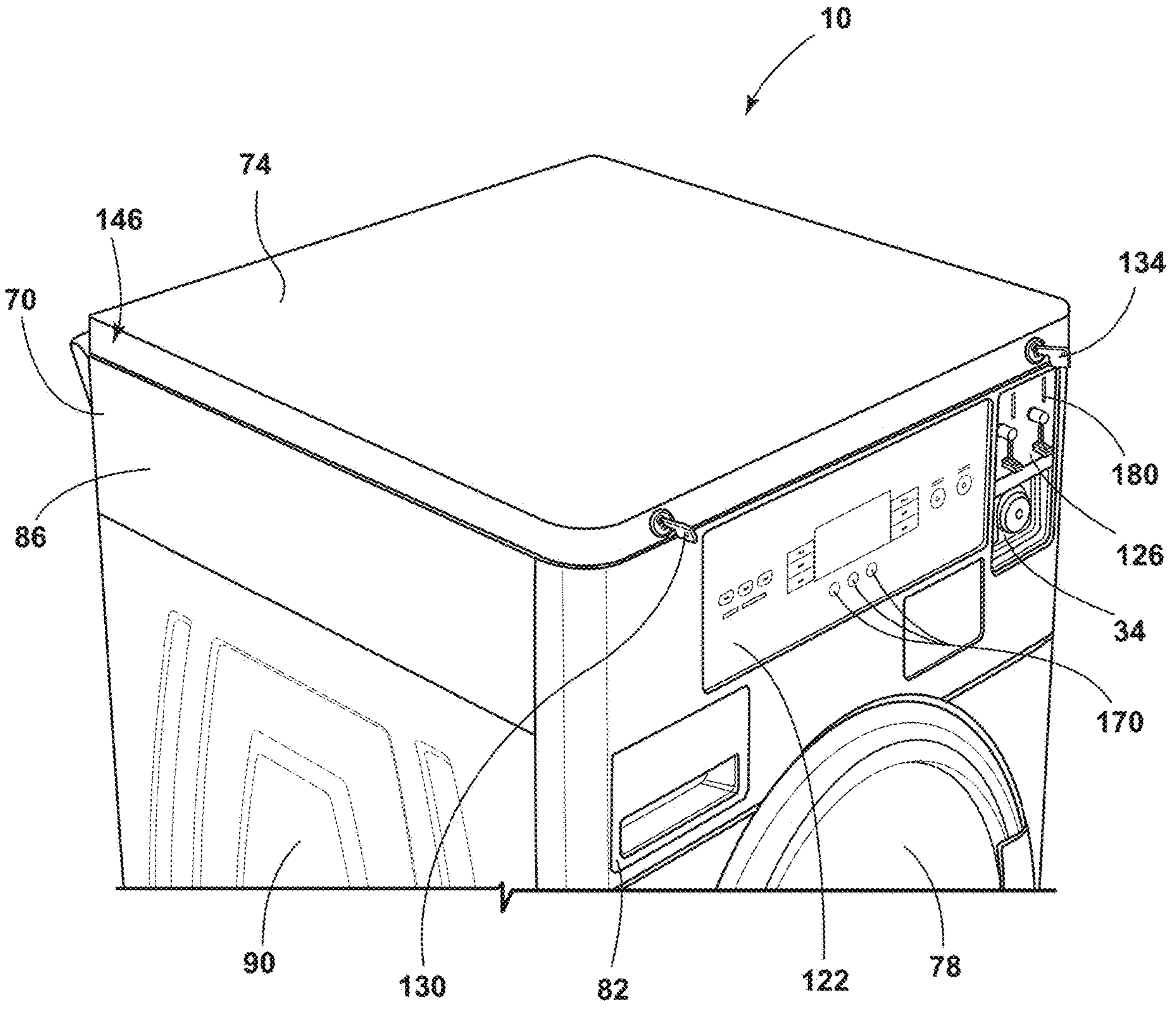
FIG. 1 is a front perspective view of an appliance with a lid in a lowered position of the present disclosure.

The components in the figures are not necessarily to scale, emphasis instead being placed upon illustrating the principles described herein.

DETAILED DESCRIPTION

The present illustrated embodiments reside primarily in combinations of apparatus components related to a token collection assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-10A, reference numeral 10 generally designates an appliance that includes a token collection assembly 14. The token collection assembly 14 includes a vault 18 defining a cavity 22. The vault 18 includes openings 26 that are defined by a first surface 30 of the vault 18. A token box 34 is positioned within the cavity 22 of the vault 18. The token box 34 is at least partially open relative to the openings 26 in the vault 18. A cover feature 38 includes a rotating shell 42 that is operably coupled to a slidable base 46 that defines locking apertures 50. The cover feature 38 is operably coupled to the vault 18 via fasteners 54.

Referring again to FIGS. 1-3, the appliance 10 includes a body 70 with a lid 74 and a door 78 disposed on the body 70. As depicted, the body 70 includes typical features of a laundry appliance such as a dispenser compartment 82. However, it is also contemplated that the appliance 10 may be other appliances including, but not limited to, a dishwasher, a stove, and other token and coin-operated appliances known in the art. An exterior 86 of the appliance 10 may be defined by an outer casing 90 of the body 70. Additionally, the body 70 may include a frame 94 that may define an interior 98 of the appliance 10 and a machine compartment 102 in which the vault 18 and the cover feature 38 may be housed. A crossbar 106 may span a forward portion 110 of the body 70 and defines an interference member 114 that may engage with the cover feature 38, described in further detail below. It is also contemplated that the appliance 10 is a commercial appliance that utilizes tokens 118 to trigger the operation of the appliance 10. Accordingly, the token collection assembly 14 described herein is generally contemplated for use with any commercial appliance that utilizes tokens 118.

Figure 2:
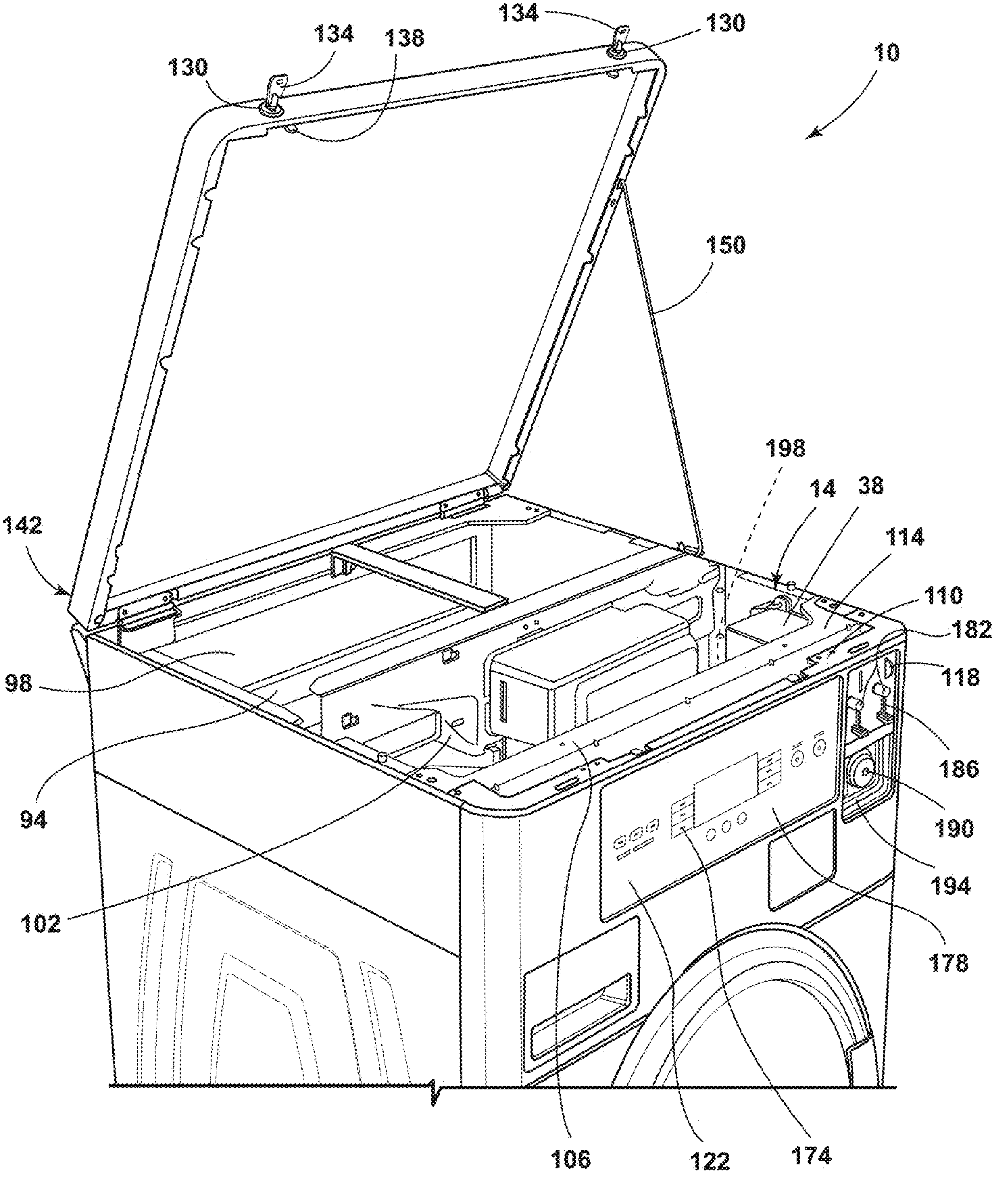
FIG. 2 is a front perspective view of the appliance of FIG. 1 with the lid in a raised position.
Figure 3:
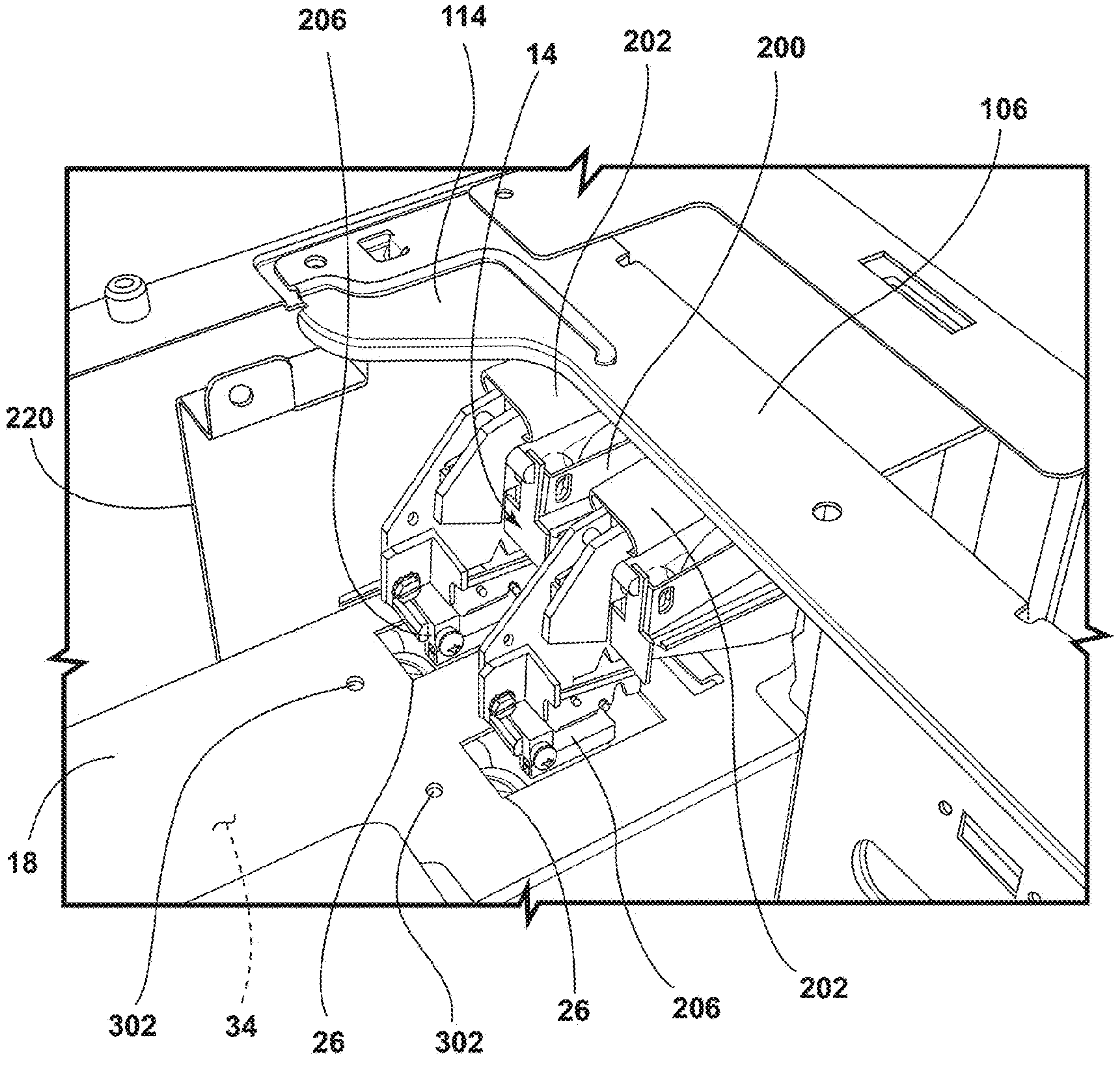
FIG. 3 is a side perspective view of a token discriminating mechanism of the present disclosure.
Figure 4:
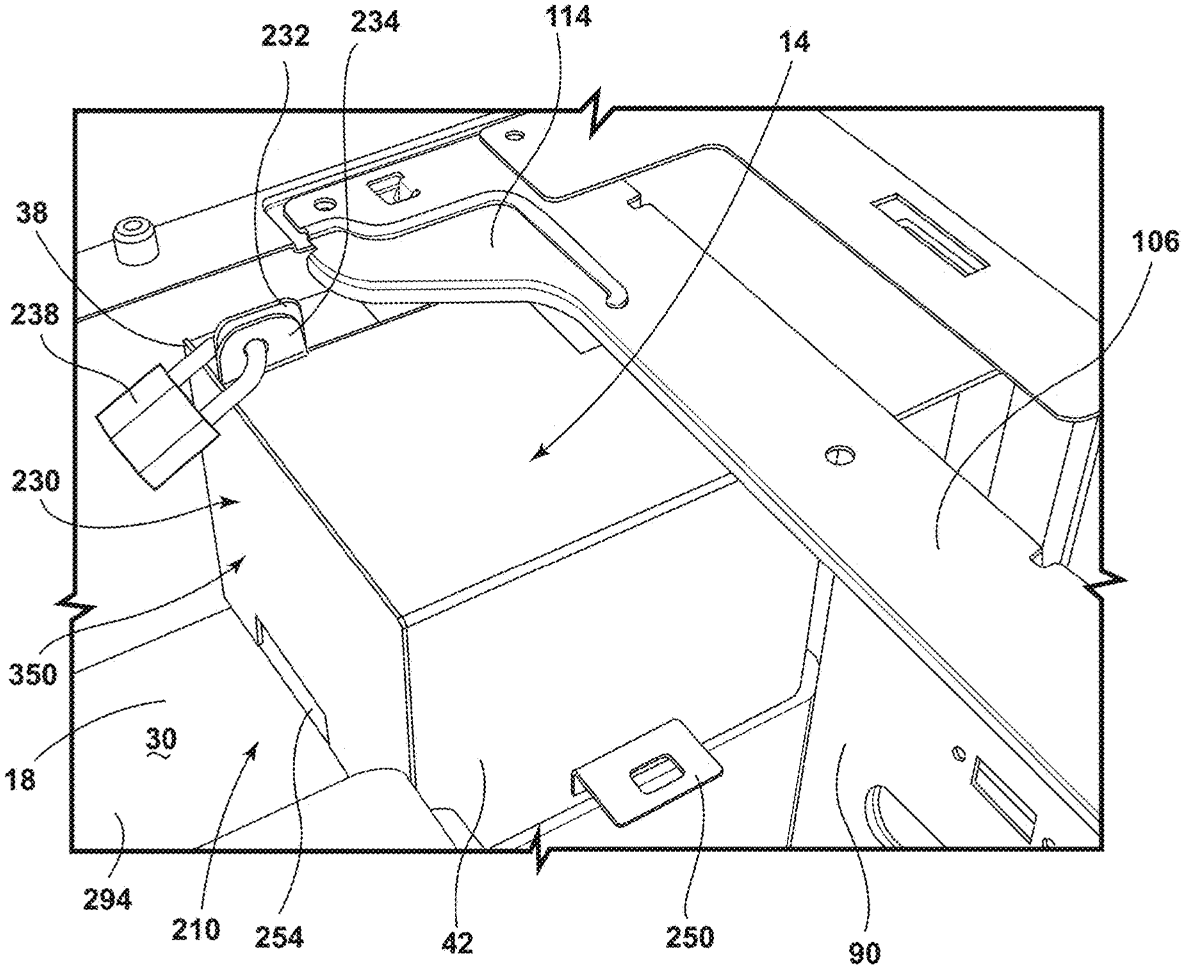
FIG. 4 is a side perspective view of a token collection assembly with a shell in a closed position of the present disclosure.

As illustrated, the lid 74 is positioned above a user interface 122, a token exchange portion 126, and the token box 34. Additionally, the lid 74 may define a lock 130 which a key 134 may engage to release the lid 74 from the body 70 of the appliance 10. As depicted in FIG. 2, the lid 74 includes two locks 130, such that two keys 134 are used to unlock the lid 74 by rotating locking protrusions 138 to disengage with the body 70 of the appliance 10. The lid 74 may be operable between a raised position 142 and a lowered position 146, wherein the lid 74 may be supported by a pivotable brace 150 when in the raised position 142. Although illustrated in an upward direction, it is contemplated that the lid 74 may be positioned along the body 70 at various locations such that the raised position 142 may correspond with a lateral opening of the lid 74 as well as a vertical opening of the lid 74.

The user interface 122 may contain buttons 170 configured to communicate with a controller to control the appliance 10. Additionally or alternatively, the user interface 122 may display touch indicia 174 that provides a touch surface 178 for the user to interface with, while the touch indicia 174 may be merely a sensor in communication with the controller. The user interface 122 allows a user to make selections regarding, for example, a wash cycle. In order for the user interface 122 to become functioning via the controller, the user engages the token exchange portion 126 by inserting one or more tokens 118 through token slots 180. The token exchange portion 126 may also include token return buttons 182 that may return the tokens 118 to the user via token return slots 186. The tokens 118 deposited for use with the appliance 10 are ultimately received in the token box 34. The token box 34 may include a locking member 190 disposed on a first end 194 of the token box 34, while a second end 198 may be positioned within the vault 18. It is also contemplated that the locking member 190 may be disposed on the second end 198 and the first end 194 may be positioned within the vault 18. The token box 34 is secured within the vault 18 and further secured by the cover feature 38. The cover feature 38 and the vault 18 are contemplated to be positioned within the body 70 of the appliance 10, such that the lid 74 covers the cover feature 38 and the vault 18 in the lowered position 146. Alternatively, the cover feature 38 and the vault 18 may be disposed outside of the appliance 10.

A token discriminating mechanism 200 may be positioned rearward of the forward portion 110 of the body of the appliance 10. Referring again to FIGS. 2 and 4, the token discriminating mechanism 200 receives the tokens 118 from the user and may determine whether the token 118 is of the type accepted for use with the appliance 10. If the tokens 118 are incompatible with the token discriminating mechanism 200, then the tokens 118 will be returned to the user via the token return slots 186. Additionally or alternatively, the token discriminating mechanism 200 may return the tokens 118 if the user presses the token return buttons 182 prior to making a selection on the user interface 122. Once received by the token discriminating mechanism 200, the tokens 118 may be deposited into the token box 34 positioned within the vault 18. The token discriminating mechanism 200 includes an arm 202 that extends inward relative to the exterior 86 of the appliance 10 and a dispensing end 206. The tokens 118 may pass through the arm 202 of the token discriminating mechanism 200 and into the dispensing end 206. Generally, the dispensing end 206 of the token discriminating mechanism 200 may align with the openings 26 so the tokens 118 may be deposited directly through the vault 18 and into the token box 34.

Referring to FIGS. 6-10A, the cover feature 38 may be positioned beneath the crossbar 106, such that the interference member 114 of the crossbar 106 may prevent rotational movement of the shell 42 in a first position 210 of the base 46 as well as an intermediate position 214 of the cover feature 38. It is generally contemplated that at least the intermediate position 214 of the cover feature 38 may be defined as the shell 42 being uncoupled from a fixed wall 220 as the cover feature 38 transitions into an open position 222 of the cover feature 38. The open position 222 of the cover feature 38 may be defined by a second position 226 of the base 46. When the shell 42 clears the interference member 114 in the second position 226 of the base 46, the shell 42 may freely rotate to a servicing position 228 described in greater detail below with reference to FIG. 10.

Referring to FIGS. 5A, 7A, 8A, 9A, and 10A, while the second position 226 of the base 46 may define the open position 222 of the cover feature 38, the first position 210 of the base 46 may define a closed position 230 of the cover feature 38. The intermediate position 214 of the cover feature 38 is a transitory position between the first and second positions 210, 226 of the base 46. Described in further detail below, the cover feature 38 may transition between the closed, intermediate, and open positions 230, 214, 222, such that during the transitional motion of base 46 between the first and second positions 210, 226, the cover feature 38 is in the intermediate position 214.

Referring to FIGS. 4-5A and 8A, when the cover feature 38 is in the closed position 230, a first securing portion 232 may be coupled to a second securing portion 234 by a fixing member 238. The first securing portion 232 may be defined by the fixed wall 220 of the cover feature 38, and the second securing portion 234 may be defined by the shell 42 of the cover feature 38. The first and second securing portions 232, 234 may couple the shell 42 to the fixed wall 220 to define the closed position 230 of the shell 42 and the cover feature 38. While in the closed or intermediate positions 230, 214, an obstruction portion 242 of the shell 42 prevents rotation of the shell 42 by pressing against the first surface 30 of the vault 18. The obstruction portion 242 adds rotational interference for the shell 42 when the base 46 is in the first position 210. This added interference may work in combination with the interference member 114 of the crossbar 106.

In order to transition the cover feature 38 between the first and second positions 210, 226, the shell 42 may further include a tag 250 that allows a user to pull the cover feature 38 to transition the base 46 from the first position 210 to the second position 226, so the shell 42 may hingedly rotate. The cover feature 38 may also define a utility gap 254 and may provide passage for wires and other electrical equipment through the utility gap 254 to couple with other machinery in the machine compartment 102. Such electrical equipment provides a power source for the token discriminating mechanism 200, which collects the tokens 118 dispensed into the token box 34.

The vault 18 defines the openings 26, which may include a first opening 26*a* and a second opening 26*b*, through which the tokens 118 may pass to enter the token box 34. Typically, the token box 34 may have an open upper portion such that the tokens may drop directly into the token box 34 without obstruction from the token box 34. Alternatively, it is also contemplated that the token box 34 may have receiving slots that may correspond with the openings 26 in the vault 18. In assembling the token collection assembly 14, a container 290 of the token box 34 is inserted into the vault 18 with the second end 198 inserted generally rearward in the vault 18 so the first end 194 with the locking member 190 is outwardly facing proximate to the forward portion 110 and accessible relative to the exterior 86 of the appliance 10, as illustrated in FIG. 2.

Referring now to FIGS. 5-10A, the openings 26 in the vault 18 may be defined on the first surface 30, which, as illustrated, corresponds to a top of the vault 18. Additionally or alternatively, the openings 26 may be defined by a wall 294 of the vault 18 that may correspond to the first surface 30. The first surface 30 of the vault 18 further defines guide structures 298 that may be generally arcuate shaped and slidably receive the base 46. It is also contemplated that the guide structures 298 may be rectangular, triangular, or any other known shape suitable for receiving the base 46. The guide structures 298 may minimize excessive movement of the base 46 and overall excessive movement of the cover feature 38 as the base 46 may abut the guide structures 298 during the transitional movement of the cover feature 38 between the first and second positions 210, 226. The first surface 30 of the vault 18 further defines holes 302, shown in FIG. 3, through which the fasteners 54 of the cover feature 38 may extend.

Figure 7:
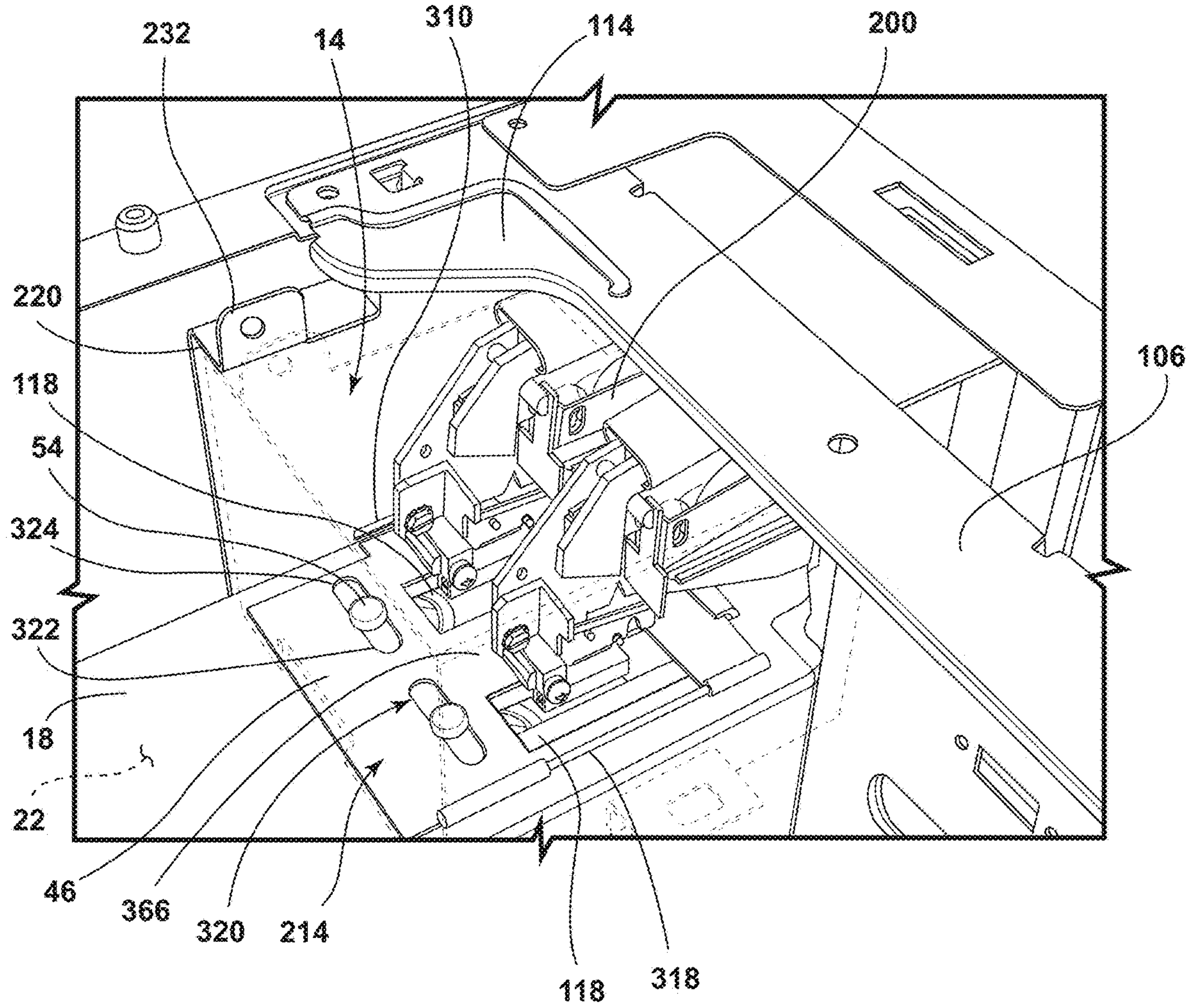
FIG. 7 is a top perspective view of the token collection assembly of FIG. 5 with the base in an intermediate position.
Figure 7A:
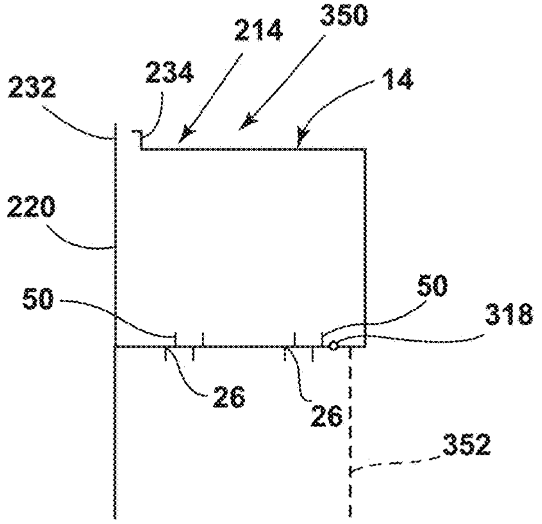
FIG. 7A is a schematic view of the token collection assembly of FIG. 7.
Figure 8:
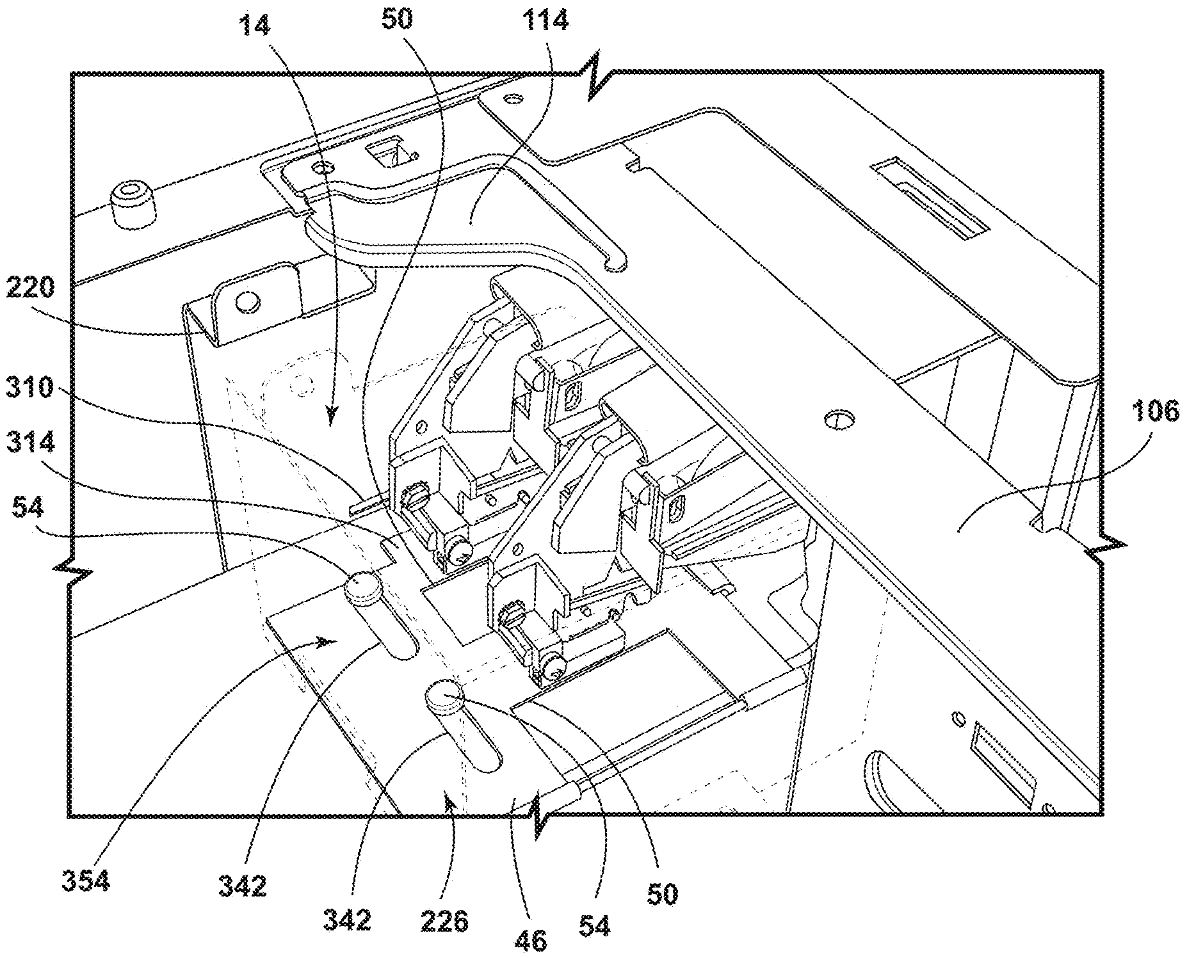
FIG. 8 is a side perspective view of the token collection assembly of FIG. 4 with the base in a second position.
Figure 8A:
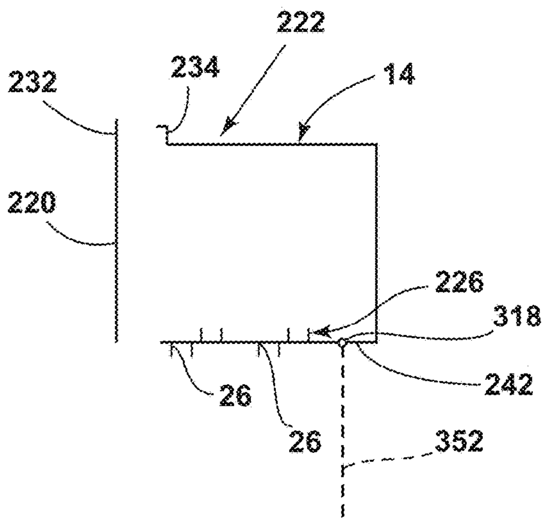
FIG. 8A is a schematic view of the token collection assembly of FIG. 8.
Figure 9:
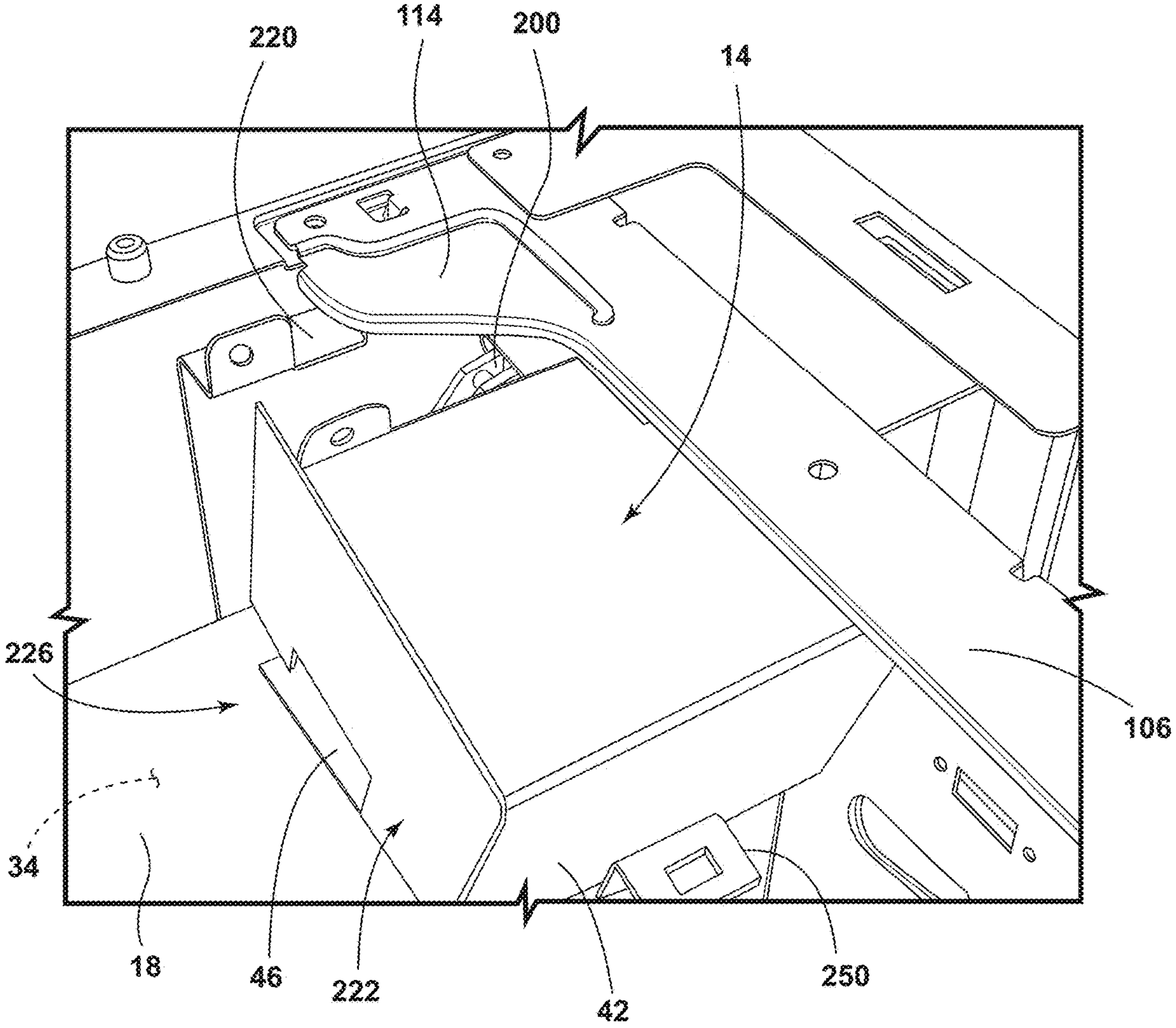
FIG. 9 is a side perspective view of the token collection assembly of FIG. 8 with the shell in the open position.
Figure 9A:
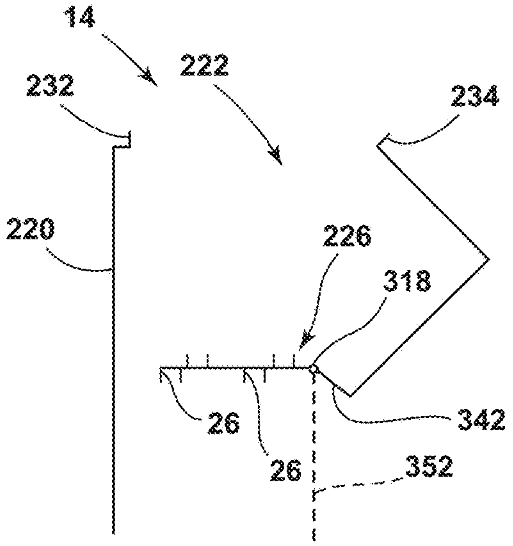
FIG. 9A is a schematic view of the token collection assembly of FIG. 9.
Figure 10:
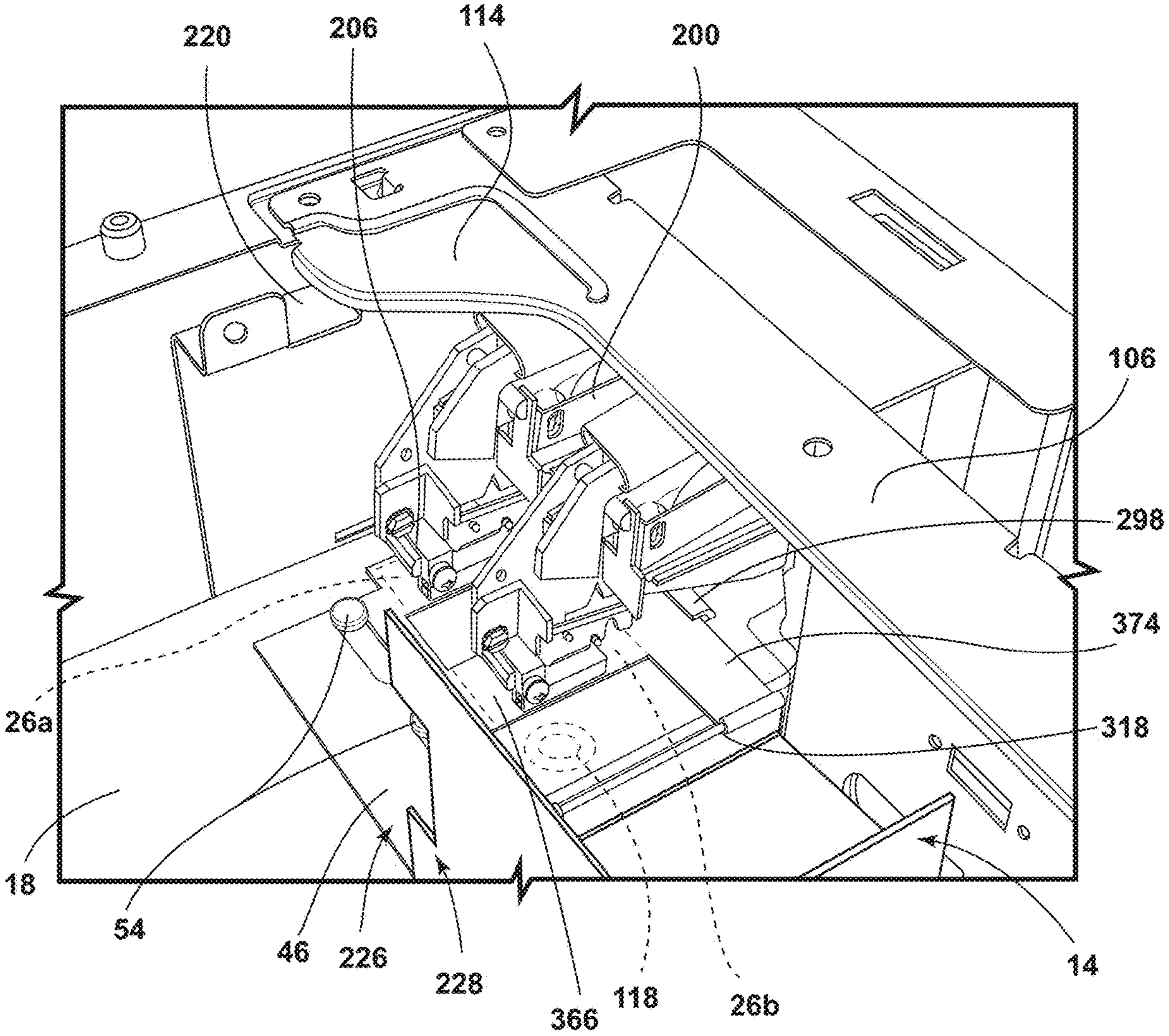
FIG. 10 is a side perspective view of the token collection assembly of FIG. 4 with the shell in a servicing position.
Figure 10A:
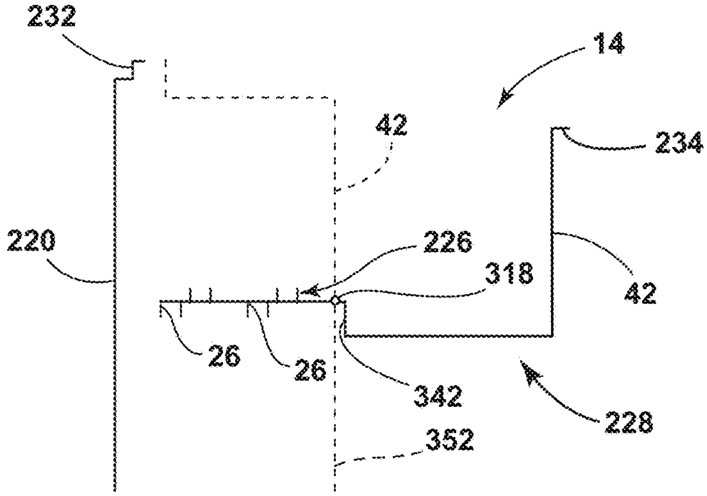
FIG. 10A is a schematic view of the token collection assembly of FIG. 10.

FIGS. 5A, 7A, 8A, and 10A depict the transition of the cover feature 38 from the closed position 230 to, ultimately, the servicing position 228. Typically, the described position of the cover feature 38 corresponds to the position of the shell 42, while the base 46 may have a separately defined position. For example, while the cover feature 38 and the shell 42 are in the closed position 230, the base 46 is in the first position 210. However, the intermediate position 214 may describe the position of the entirety of the cover feature 38, including the base 46. As illustrated in FIG. 7A, the shell 42 and the base 46 are both in the intermediate position 214 with the locking apertures 50 of the base 46 partially offset from the openings 26. While the cover feature 38 is in the intermediate position 214, the cover feature 38 may be defined as simultaneously in the open position 222. However, the open position 222 of the cover feature 38 may also correspond to the second position 226 of the base 46, as illustrated in FIG. 8A.

With further reference to FIGS. 5-10A, proximate to the openings 26, a guide slot 310 may be defined by the fixed wall 220. The guide slot 310 may provide a poka-yoke, or mistake-proof, way of returning the base 46 to the first position 210. The guide slot 310 may provide additional structural security by retaining a tab 314 of the base 46 as there may be spacing between fastening slots 320 defined by the base 46 and the fasteners 54 providing for potential shifting of the base 46. It is generally contemplated that, if fasteners 54 are uncoupled from the base 46 and the vault 18, the tab 314 may be positioned within the guide slot 310 to further prevent the shell 42 from rotating or entering the servicing position 228.

Figure 5:
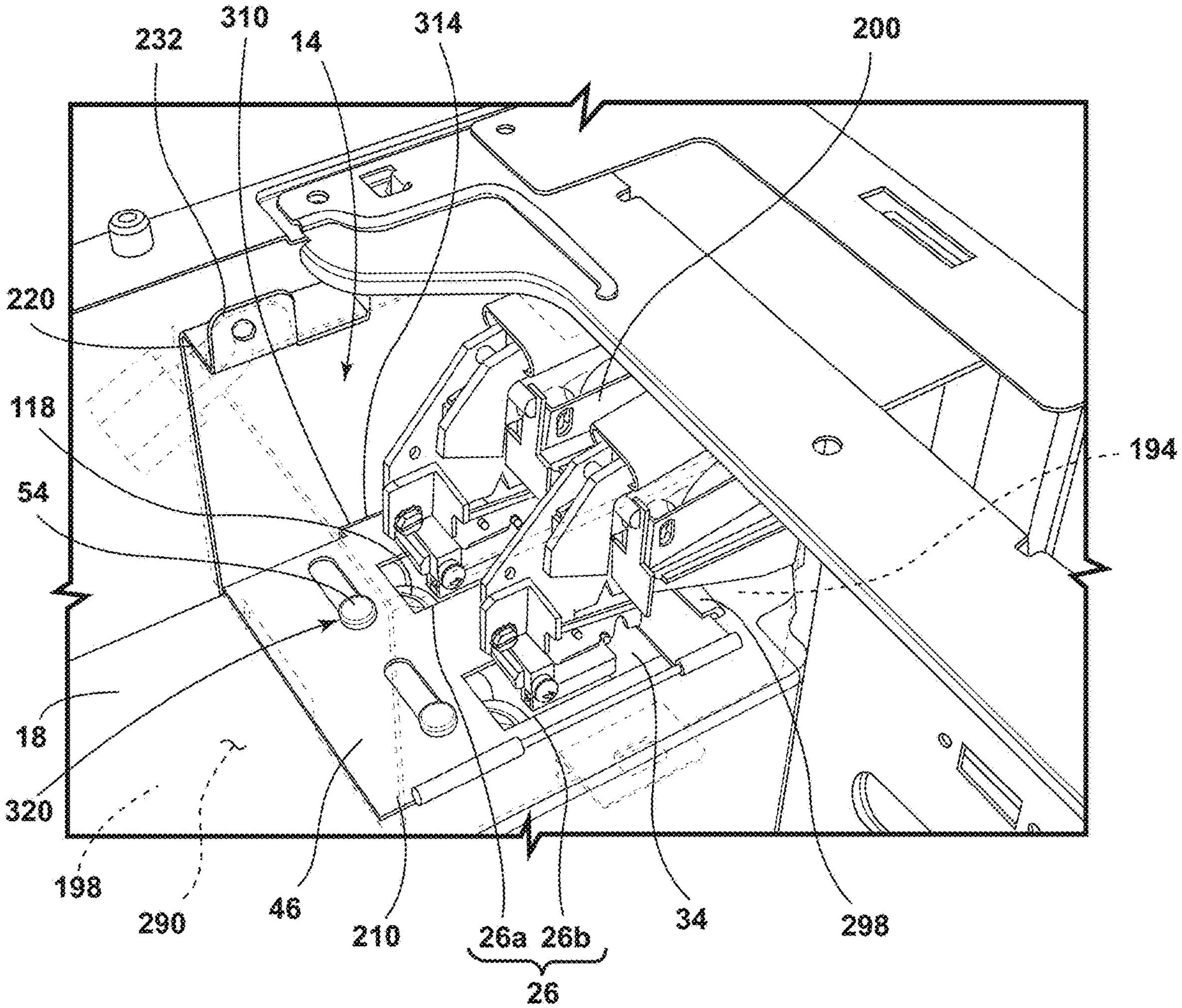
FIG. 5 is a top perspective view of the token collection assembly of FIG. 4 with the shell in dashed lines and a base in a first position.
Figure 5A:
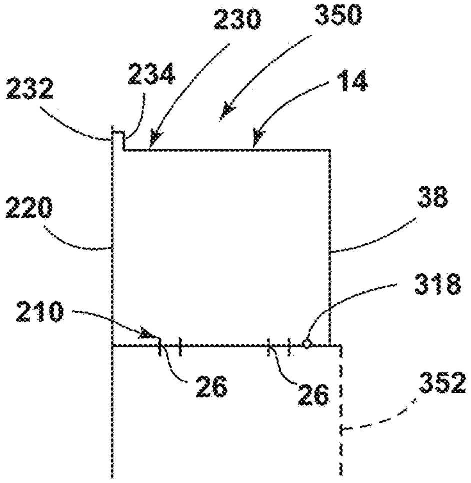
FIG. 5A is a schematic view of the token collection assembly of FIG. 5.
Figure 6:
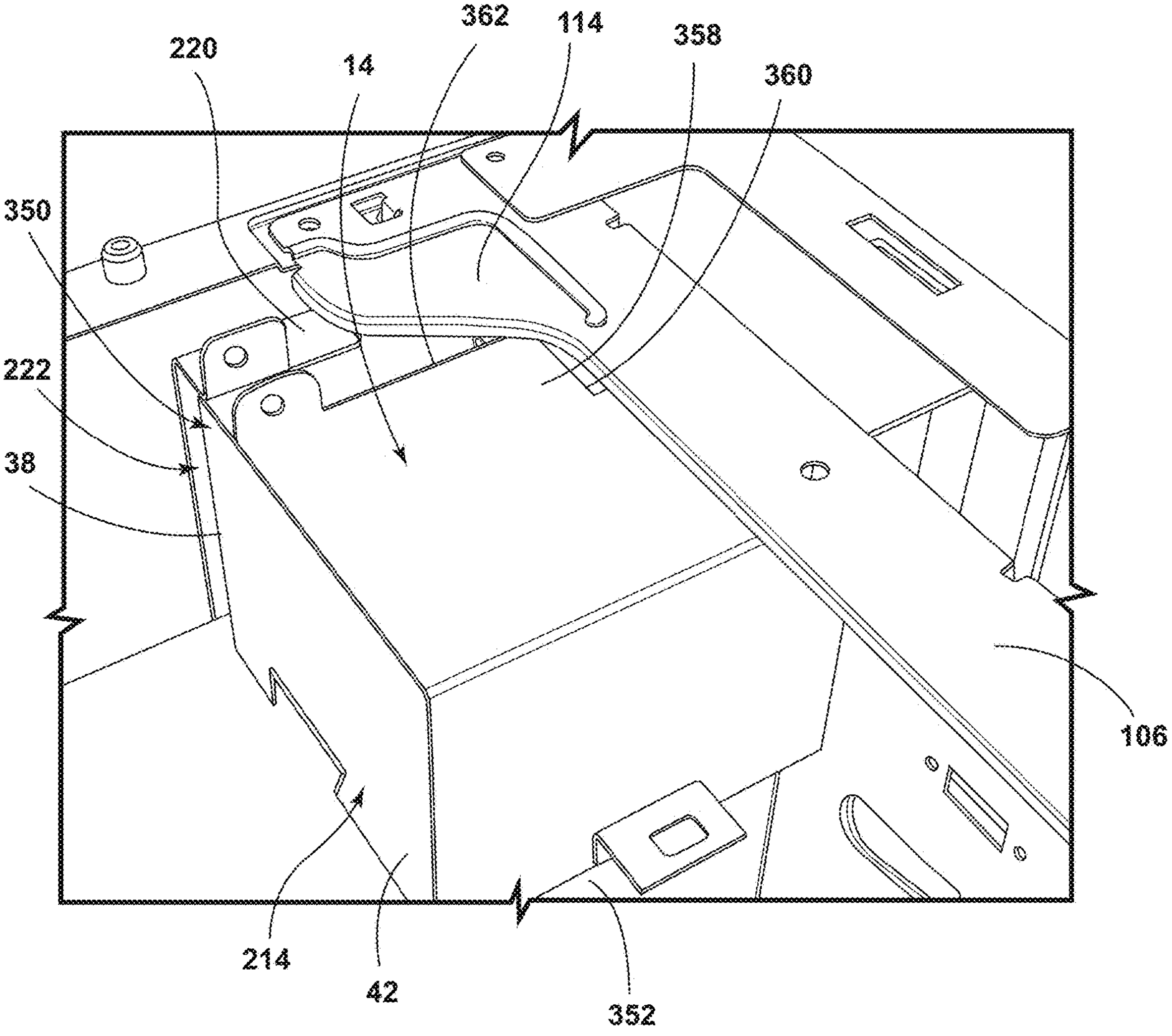
FIG. 6 is a top perspective view of the token collection assembly of FIG. 5 with the base in an intermediate position.

Typically, the tab 314 may be constructed to match the first opening 26*a* in the vault 18. Accordingly, the tab 314 may secure the first opening 26*a* while the base 46 is in the second position 226. As the base 46 is transitioned through the intermediate position 214, the tab 314 may be removed from the guide slot 310 and may at least partially cover the first opening 26*a* in the intermediate position 214 of the cover feature 38. Once the base 46 enters the second position 226, it is generally contemplated that the first opening 26*a* may be fully covered by the tab 314 and other portions of the base 46. As illustrated in FIG. 5, the base 46 is disposed on the vault 18 in the first position 210 with the tab 314 inserted in the guide slot 310.

A hinge assembly 318 may couple the base 46 to the shell 42 to further define the cover feature 38. The base 46 may further define fastening slots 320 having a first portion 322 and a second portion 324, which may further couple the base 46 to the vault 18 via the fasteners 54 extending through the fastening slots 320 defined by the base 46 and the holes 302 (FIG. 3) defined by the vault 18. As the base 46 transitions from the first position 210 to the second position 226, the fastening slots 320 may transition around the fasteners 54. For example, when the base 46 is in the first position 210, the fasteners 54 are positioned proximate to the first portion 322 of the fastening slots 320, and when the base 46 is in the second position 226, the fasteners 54 are positioned proximate to the second portion 324 of the fastening slots 320.

In addition, the base 46 defines the locking apertures 50, which may be configured to align with the openings 26 in the vault 18 when the base 46 is in the first position 210. Although the base 46 is typically coupled to the vault 18, the base 46 may slide relative to the vault 18. For example, the first position 210 of the base 46 may be further defined by the alignment of the locking apertures 50 and the openings 26, such that the tokens 118 may be deposited through the vault 18 and into the token box 34 in the first position 210 of the base 46. Comparatively, the second position 226 of the base 46 may be further defined by the sliding of the base 46 relative to the vault 18 such that the tab 314 may be removed from the guide slot 310 and the locking apertures 50 are offset from the openings 26. The alignment of the locking apertures 50 and the openings 26 in the first position 210 of the base 46 provides selective access into the token box 34. For example, if there is a need for maintenance of the token discriminating mechanism 200, the base 46 will be positioned in the first position 210, thereby blocking access to the tokens 118 and the token box 34.

Referring still to FIGS. 5-10A, in order to transition the cover feature 38, the first and second securing portions 232, 234 may be uncoupled by removing the fixing member 238 at which point the shell 42 may be said to be in the intermediate position 214. Accordingly, the shell 42 may be in the intermediate position 214 while the base 46 is in either the first or second positions 210, 226. However, while the base 46 is in the first position 210, the shell 42 is unable to rotate about the hinge assembly 318 a significant amount. The limited rotation of the shell 42 may be defined as a covering position 350 of the cover feature 38. While in the covering position 350, the locking apertures 50 are at least partially aligned with the openings 26 so the tokens 118 may enter the token box 34. As the openings 26 are open to the token box 34 via the locking apertures 50, the shell 42 may be securely coupled to the fixed wall 220, such that the base 46, locking apertures 50, and openings 26 of the vault 18 may be inaccessible in the covering position 350 of the cover feature 38. Additionally and alternatively, the cover feature 38 may be in the intermediate position 214 while still in the covering position 350, such that the openings 26 of the vault 18 may be inaccessible as the interference member 114 may at least partially prevent the shell 42 from rotating into the servicing position 228. In combination, the interference member 114 of the crossbar 106 and the obstruction portion 242 of the shell 42 prevent rotation of the shell 42 when the base 46 is in the first position 210 or in any position between the first and second positions 210, 226.

Moreover, when the base 46 is in the first position 210 and the shell 42 is in the intermediate position 214, the shell 42 may not rotate because of the position of the cover feature 38 relative to the vault 18. In order to rotate, the shell 42 rotates about the hinge assembly 318 and is repositioned proximate to a sidewall 352 of the vault 18. It is generally contemplated that, when the base 46 is in the first position 210, the shell 42 may be prevented from rotating about the hinge assembly 318. Thus, so long as the base 46 is in the first position 210, the shell 42 may be described as being in a locking position 354. Accordingly, the shell 42 may only be operable relative to the base 46 in the second position 226. While in the intermediate position 214, between the first and second positions 210, 226 of the base 46, the shell 42 may be further prevented from rotating into the servicing position 228 by the interference member 114 of the crossbar 106.

By way of example, and not limitation, the shell 42 defines a brim 358 that extends along a side 362 of the shell 42 that contacts the fixed wall 220. The brim 358 may extend under the interference member 114 of the crossbar 106 to hinder the movement of the shell 42 in the closed and intermediate positions 230, 214. In addition, the brim 358 and the shell 42 may also define a notch 360 that is under the interference member 114 in the first position 210 of the base 46. When the base 46 is moved to the second position 226, the brim 358 is positioned so that the notch 360 allows the brim 358 to bypass the interference member 114. This configuration allows the brim 358 and the interference member 114 to cooperatively cover the token collection assembly 14 in the first position 210 of the base 46, while allowing selective access to the token collection assembly 14 in the second position 226 of the base 46.

Additionally, the tokens 118 within the vault 18 may still be inaccessible when the cover feature 38 is in the intermediate position 214, such that the intermediate position 214 of the cover feature 38 may further define the locking position 354 of the cover feature 38. As the base 46 transitions into the second position 226, the fasteners 54 may also transition from the first portion 322 to the second portion 324 of the fastening slots 320. During this transition, the tab 314 may be removed from the guide slot 310 and may cover the first opening **26*a*, while a central portion 366 of the base 46 covers the second opening 26*b*. The positioning of the tab 314 and the central portion 366 over the first and second openings 26*a*, 26*b* also further defines the locking position 354 of the cover feature 38**.

When the base 46 is in the second position 226, the shell 42 may transition from the open position 222 into the servicing position 228. The servicing position 228 of the shell 42 provides access to the token discriminating mechanism 200 for routine maintenance, while the tab 314 and the central portion 366 of the base 46 secure the first and second openings **26*a*, 26*b* in the vault 18. Thus, while maintenance may be performed on the token discriminating mechanism 200, the tokens 118 cannot be removed via the openings 26. The shell 42 may rotate between the open position 222 and into the servicing position 228 via the hinge assembly 318, such that the shell 42 rotates about hinge assembly 318**.

To transition the base 46 from the first position 210 into the second position 226, the base 46 may be directed by the guide structures 298. As discussed above, where the fasteners 54 are uncoupled from the base 46 and the vault 18, the base 46 may otherwise shift during the transition between the first and second positions 210, 226 of the base 46. The guide structures 298 may help prevent the sliding of the base 46. When the base 46 is in the second position 226, the dispensing end 206 of the token discriminating mechanism 200 is positioned above the tab 314 and the central portion 366 of the base 46. Accordingly, any tokens 118 deposited while the base 46 is in the second position 226 would result in the token 118 resting on either the tab 314 or the central portion 366. However, it is generally contemplated that when the base 46 is in the second position 226, the token discriminating mechanism 200 that would otherwise receive the tokens 118, would be undergoing repairs or routine maintenance. Accordingly, while the cover feature 38 is in the second and servicing positions 226, 228, a user would likely not be inserting tokens 118 except for testing purposes during maintenance. In addition, the guide structures 298 may work in combination with the fasteners 54 to prevent at least partial uplifting of the base 46 while the shell 42 is in the servicing position 228.

As a result of the incorporation of the cover feature 38 in the token collection assembly 14, the vault 18 and the token box 34 are further secured. In particular, the adaptation of the slidable base 46 and the rotating shell 42 minimize potential removal of the tokens 118 during routine maintenance and servicing.

The invention disclosed herein is further summarized in the following paragraphs and is further characterized by combinations of any and all of the various aspects described therein.

According to one aspect of the present disclosure, an appliance includes a vault that defines a cavity and has openings that are defined by a first surface of the vault. A token box is positioned within the cavity and is partially open relative to the openings in the vault. A cover feature has a rotating shell that is operably coupled to a slidable base that defines locking apertures. The cover feature is operably coupled to the vault via fasteners.

A hinge is positioned along a first side of a base and rotationally couples a shell to the base.

A first position of a base defines apertures that are aligned with openings of a vault to provide access to the vault via locking apertures of the base.

A second position of a base defines apertures that are offset relative to openings of a vault. The base covers the openings.

A vault includes a guide structure that defines lateral motion of a base between a first position and a second position.

A base is further defined by fastening slots. Fasteners transition within the fastening slots as the base transitions between a first position into a second position.

A shell is hingedly rotatable relative to a vault between a covering position and a servicing position.

According to another aspect of the present disclosure, a vault defines an interior cavity and openings are defined by a wall of the vault and provides selective access into the cavity. A base is slidably coupled to the vault between a first position and a second position. The base defines locking apertures that are offset relative to the openings of the vault in the second position of the base. A shell is operable relative to the base only in the second position.

A token box has a body that defines a first end and a second end. The second end of the box is disposed within a cavity of a vault. A locking member is coupled to the first end of the token box.

Tokens are received by a token box when a base is in a first position.

Locking apertures of a base are aligned with openings of a vault in a first position and define selective access into a cavity.

A servicing position defines a hinged rotation of a shell in a second position that provides access to a token discriminating mechanism.

A token box is inaccessible via openings in a vault when a base and a shell are in at least one of a second position and a servicing position.

Apertures of a base align with openings of a vault in a first position. A shell is rotationally fixed in a covering position relative to the base in the first position.

According to yet another aspect of the present disclosure, a vault defines a cavity wherein openings define the vault and are open into the cavity. A token box is disposed within the cavity of the vault. A cover feature has a shell and a base. The base is slidably coupled to the vault to transition between a first position and a second position. The shell is hingedly coupled to the base to hinge between a covering position and a servicing position when the base is in the second position.

A crossbar has an interference member that is positioned above a shell when a base is in a first position and defines a locking position.

An open position of a cover feature is defined by a base in a second position.

A closed position of a cover feature is defined by a first position of a base.

A fixed wall defines a receiving space. A tab outwardly extends from a base. The tab is translationally disposed within the receiving space of the fixed wall.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A token collection assembly, comprising:
a vault defining openings;
a fixed wall coupled to the vault and including a first securing portion; and
a cover feature selectively coupled to the fixed wall, the cover feature including:
 a slidable base including a tab; and
 a shell hingedly coupled to the slidable base and operable between a covering position that conceals the slidable base and a servicing position configured to provide access to the slidable base, the shell including a second securing portion selectively coupled to the first securing portion of the fixed wall.

2. The token collection assembly of claim 1, wherein the slidable base is operable between a first position, a second position, and an intermediate position therebetween, and wherein the shell is in the covering position when the slidable base is in the second and intermediate positions.

3. The token collection assembly of claim 2, wherein the slidable base is disposed over the openings defined by the vault in the second position to conceal the openings.

4. The token collection assembly of claim 2, wherein the fixed wall defines a guide slot, and wherein the tab of the slidable base is positioned in the guide slot in the first position.

5. The token collection assembly of claim 1, further comprising:

a token discriminating mechanism proximate the openings defined by the vault.

6. The token collection assembly of claim 1, further comprising:

an interference member, wherein a brim of the cover feature selectively engages the interference member in the covering position of the shell.

7. The token collection assembly of claim 6, wherein the shell of the cover feature defines a notch proximate the brim, and wherein the interference member passes through the notch in the servicing position of the shell.

8. A token collection assembly for an appliance, comprising:

a fixed wall defining a guide slot;

a crossbar including an interference member proximate the fixed wall; and a cover feature selectively coupled to the fixed wall, the cover feature including a shell and a base that is operable between a first position and a second position.

9. The token collection assembly of claim 8, wherein the base includes a central portion and a tab and defines locking apertures.

10. The token collection assembly of claim 9, wherein the tab is positioned in the guide slot in the first position of the base.

11. The token collection assembly of claim 9, further comprising:

a vault including a token box and defining openings, wherein the locking apertures of the base are aligned with the openings of the vault in the first position that defines selective access into the token box.

12. The token collection assembly of claim 11, wherein the tab and the central portion of the base are disposed over the openings defined by the vault in the second position of the base.

13. The token collection assembly of claim 8, wherein the shell is operable between a covering position and a servicing position.

14. The token collection assembly of claim 13, wherein the shell is disposed beneath the interference member in the covering position.

15. A token collection assembly, comprising:

a vault defining openings configured to receive tokens;

a token box disposed within the vault;

a base slidably coupled to the vault between a first position and a second position and defining locking apertures, wherein the second position is defined by the locking apertures being offset relative to the openings defined by the vault; and a shell hingedly coupled to the base and operable between a covering position and a servicing position about the vault.

16. The token collection assembly of claim 15, wherein a crossbar having an interference member is positioned above the shell when the base is in the first position to define a locking position.

17. The token collection assembly of claim 15, wherein the shell and the base define a cover feature that conceals the openings defined by the vault in the covering position of the shell.

18. The token collection assembly of claim 15, wherein the base further defines fastening slots, and wherein fasteners transition within the fastening slots as the base transitions between the first position into the second position.

19. The token collection assembly of claim 18, wherein the covering position of the shell is defined by the first position of the base.

20. The token collection assembly of claim 15, further including:

a fixed wall defining a guide slot; and a tab outwardly extending from the base, wherein the tab is translationally disposed within the guide slot of the fixed wall in the first position of the base.

* * * * *